United States Patent
Lee

(10) Patent No.: US 8,326,287 B2
(45) Date of Patent: Dec. 4, 2012

(54) METHOD FOR PROVIDING ROAMING SERVICE OF INTERNATIONAL CALL AND MOBILE TERMINAL FOR THE SAME

(75) Inventor: Seung Youl Lee, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 506 days.

(21) Appl. No.: 12/600,735

(22) PCT Filed: May 16, 2008

(86) PCT No.: PCT/KR2008/002756
§ 371 (c)(1),
(2), (4) Date: Nov. 18, 2009

(87) PCT Pub. No.: WO2008/143441
PCT Pub. Date: Nov. 27, 2008

(65) Prior Publication Data
US 2010/0151855 A1     Jun. 17, 2010

(30) Foreign Application Priority Data
May 18, 2007 (KR) .................. 10-2007-0048726

(51) Int. Cl.
*H04W 4/00* (2009.01)
(52) U.S. Cl. .................................................. 455/432.2
(58) Field of Classification Search ............... 455/432.1, 455/432.2, 433, 415
See application file for complete search history.

(56) References Cited

U.S. PATENT DOCUMENTS

| | | | |
|---|---|---|---|
| 6,782,278 B2 * | 8/2004 | Chen et al. | 455/564 |
| 7,082,307 B2 * | 7/2006 | Zhou et al. | 455/445 |
| 2002/0103009 A1 * | 8/2002 | Sato | 455/558 |
| 2003/0100334 A1 * | 5/2003 | Mazzara, Jr. | 455/552 |
| 2004/0203757 A1 * | 10/2004 | Nasielski | 455/433 |
| 2004/0204117 A1 * | 10/2004 | Weiner | 455/564 |
| 2004/0224727 A1 * | 11/2004 | Benco et al. | 455/567 |
| 2004/0266428 A1 * | 12/2004 | Aaltonen | 455/432.1 |
| 2007/0243875 A1 * | 10/2007 | Gouthama et al. | 455/445 |

FOREIGN PATENT DOCUMENTS

| | | |
|---|---|---|
| KR | 10-2003-0012444 A | 2/2003 |
| KR | 10-2005-0096260 A | 10/2005 |
| KR | 10-2006-0024263 A | 3/2006 |

* cited by examiner

*Primary Examiner* — Christopher M Brandt
(74) *Attorney, Agent, or Firm* — IP Legal Services, LLC

(57) ABSTRACT

The present invention relates to a method for providing a roaming service of an international call, as a roaming method of a mobile terminal, comprises, in an international roaming mode, checking TON (Type Of Number) of an incoming number attempted to originate a call; in the case that the TON of the incoming number is not an international call, checking whether the incoming number is a telephone number of a home network or a telephone number of a visited network; and in the case that the incoming number is checked as a telephone number of a home network, changing the incoming number into an international call number using a home country code (CC) stored in a storing unit, changing the TON of the incoming number into an international call, and requesting call origination to the incoming number, and in the case that the incoming number is checked as a telephone number of a visited network, requesting local call origination without number change.

13 Claims, 8 Drawing Sheets

METHOD FOR PROVIDING ROAMING SERVICE OF INTERNATIONAL CALL AND MOBILE TERMINAL FOR THE SAME

TECHNICAL FIELD

The present invention relates to a method for providing a roaming service of an international call and a mobile terminal for the same, and in particular, to a method for providing a roaming service of an international call that provides usage convenience in an international roaming mode and a mobile terminal for the same.

BACKGROUND ART

With recent rapid increase in demand for mobile communication, there is an increasing demand for global roaming capable of communication using the same number everywhere in the world, and accordingly, an international roaming service using a smart card such as SIM (Subscriber Identity Module), UIM (User Identity Module) or USIM (Universal Subscriber Identity Module) is provided.

SIM, as a smart card module inserted into an European wireless communication (GSM (Global System for Mobile communication)) type terminal for certification of a mobile communication network, complies with ISO (International Organization for Standardization) 7816, and is capable of storage of non-volatile data such as a telephone directory or a wireless communication service provider information, encoding, and execution of software. And, a SIM card contains a telephone number, a personal security key or data necessary to operate a mobile terminal, and after the SIM card is separated from a mobile terminal in use and mounted in a new mobile terminal, communication is possible by the new mobile terminal.

UIM, as a smart card module according to ISO 7816, is inserted into a multimode terminal of CDMA (Code Division Multiple Access) and European wireless communication (GSM), and supports certification and roaming functions. A UIM card is a kind of CDMA SIM card.

USIM, as a smart card module according to ISO 7816, is inserted into a third-generation wireless terminal, and provides network certification and an additional function, and a USIM card is standardized to mount at least 64 KB EEPROM (Electrically Erasable Programmable Read Only Memory).

To make an international call with a mobile terminal, first a user inputs an international call recognition number or an international telephone number recognition number (for example, 001, 002, 00345 and so on), a country number and a telephone number except "0" in sequence. In the case that the user does not know an international call recognition number or the user wants to use an international call recognition number provided as a default by a mobile service provider, the user may request an international call by inputting a plus "+" sign into a start of a telephone number. The plus "+" sign is displayed by continuously inputting a star "*" sign or long pressing a numeric key "0" with a general GSM terminal.

The same is the case that a user makes an international call using a telephone directory stored in a memory of a mobile terminal or a memory of a smart card module (SIM, UIM or USIM). That is, if the user does not input a plus "+" sign into a start of a telephone number when storing the telephone number into a telephone directory, TON (Type Of Number) of the telephone number is stored as "Unknown", and if the user inputs a plus "+" sign, TON of the telephone number is stored as "INT (International)". Thus, judgment can be made whether an incoming call is an international call or not by the TON in a mobile communication network. Here, "Unknown" is an indicator system, by which a mobile terminal or a mobile switching center (MSC) can not recognize TON of a telephone number as an international call, and "INT" is an indicator system, by which a mobile terminal or a mobile switching center can recognize TON of a telephone number as an international call.

FIG. 1 is a flow chart of a conventional call connecting method performed on an incoming number stored in a telephone directory of a mobile terminal.

Referring to FIG. 1, a user searches a telephone number stored in a memory of a mobile terminal or USIM (S101) and attempts to originate a call to a telephone number of a specific subscriber (S102), and a mobile switching center judges TON of the incoming number (S103).

In the case that the TON of the incoming number is checked as "Unknown" in the step S103, the mobile switching center interprets the incoming number and performs local call processing (S107), and in the case that the TON of the incoming number is checked as "INT", the mobile switching center judges whether a country code (CC) of the incoming number is the same as a country code of a visited network (S104).

In case it is judged that the country code of the incoming number is not the same as a country code of a visited network in the step S104, the mobile switching center inserts an international PFX set therein before the incoming number, transmits IAM (Initial Address Message) to an international gateway MSC, and performs international call processing (S105 and S107).

Meanwhile, in the case that the country code of the incoming number is the same as a country code of a visited network, the mobile switching center transmits an SRI (Sending Routing Information) message to a home location register (HLR) or a gateway MSC of other service provider of the visited network, and performs call processing (S106 and S107).

However, in the case that, in a foreign country, a user uses a mobile terminal used in the home country by roaming, in some cases, the conventional call connecting method does not process a call made using a telephone directory. That is, a local telephone number stored in a telephone directory should be processed as an international call, however TON of a telephone number stored in the home country is generally set as "Unknown", and thus the user can not make a call to a telephone number stored in the telephone directory in the international roaming mode.

Meanwhile, conventionally, in the case that the user stores telephone numbers belonging to a visited network into a telephone directory of a mobile terminal, the user should insert a country code of a visited network into each telephone number.

DISCLOSURE

Technical Problem

The present invention is designed to solve the above-mentioned problems, and therefore it is an object of the present invention to provide a method for providing a roaming service of an international call, which in the case that an incoming number requested for call origination in international roaming is not a type of an international call, but a telephone number of a home network, changes the incoming number into a type of an international call and performs call processing, and in the case that the incoming number is a telephone number of a visited network, performs local call processing, and a mobile terminal for the same.

And, it is another object of the present invention to provide a method for providing a roaming service of an international call, which in the case that an incoming number requested for call origination in international roaming is not a type of an international call, allows a user to check whether the incoming number is a telephone number of a home network or a telephone number of a visited network, classifies the incoming number into an international call of home network and a local call of a visited network and performs call processing according to classification, and a mobile terminal for the same.

Further, it is another object of the present invention to provide a method for providing a roaming service of an international call, which in the case that a telephone number of an incoming call or SMS (Short Message Service) is a telephone number of home network stored in a telephone directory of a mobile terminal, displays a corresponding caller's identification, and a mobile terminal for the same.

Technical Solution

According to a preferred embodiment of the present invention, a method for providing a roaming service of an international call, as a roaming method of a mobile terminal, comprises (a) in an international roaming mode, checking TON (Type Of Number) of an incoming number attempted to originate a call; (b) in the case that the TON of the incoming number is not an international call, checking whether the incoming number is a telephone number of a home network or a telephone number of a visited network; and (c) in the case that the incoming number is checked as a telephone number of a home network, changing the incoming number into an international call number using a home country code (CC) stored in a storing unit, changing the TON of the incoming number into an international call, and requesting call origination to the incoming number, and in the case that the incoming number is checked as a telephone number of a visited network, requesting local call origination without number change.

In the step (a), the call origination attempt may be made by telephone directory search and selection of a user, direct input of a user or SMS callback.

The step (b) may further include generating a message window for checking whether the incoming number is a telephone number of a home network or a telephone number of a visited network, and displaying the message window through a user interface.

Preferably, the changing into an international call number is made by inserting the home country code (CC) before the incoming number and deleting a first "0" included in the incoming number.

According to another embodiment of the present invention, a method for providing a roaming service of an international call, as a roaming method of a mobile terminal, comprises in an international roaming mode, checking TON of an outgoing number when receiving a call or SMS; in the case that the TON of the outgoing number is an international call, comparing a country code of the outgoing number with a home country code stored in a storing unit; in the case that the country code of the outgoing number is the same as the home country code stored in the storing unit, changing the outgoing number into a local call number and changing the TON of the outgoing number into a type that is not recognized as an international call; and searching a telephone directory stored in the storing unit and outputting a number of a calling party subscriber corresponding to the outgoing number on a display.

According to another aspect of the present invention, a mobile terminal for providing a roaming service of an international call, comprises a storing unit for storing a country code and a telephone number of a home network, for which the mobile terminal subscribed; an international roaming mode recognizing unit for comparing a provider information received from a mobile communication network with a set provider information and judging whether it is an international roaming mode; a TON checking unit for, in an international roaming mode, checking TON of an incoming number requested for call origination; an incoming number changing unit for, in the case that the TON of the incoming number is not an international call and is a telephone number of a home network, changing the incoming number into an international call number using a home country code stored in the storing unit, and changing the TON of the incoming number into an international call; and a call origination requesting unit for, in the case that the incoming number is a telephone number of a home network, requesting international call origination to the incoming number changed by the incoming number changing unit, and in the case that the incoming number is a telephone number of a visited network, requesting local call origination.

The TON checking unit may be configured to check TON of an incoming number requested for call origination by telephone directory search and selection of a user, direct input of a user or SMS callback.

Preferably, the mobile terminal may further comprise an incoming number check window generating unit for, in the case that the TON of the incoming number is not an international call, generating a message window for allowing a user to check whether the incoming number is a telephone number of a home network or a telephone number of a visited network.

Preferably, the incoming number changing unit changes the incoming number into an international call number by inserting a home country code before the incoming number and deleting a first "0" included in the incoming number.

DESCRIPTION OF DRAWINGS

Preferred embodiments of the present invention will be more fully described in the following detailed description, taken accompanying drawings. However, it should be understood that the description proposed herein is just a preferable example for the purpose of illustrations only, not intended to limit the scope of the invention. In the drawings.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
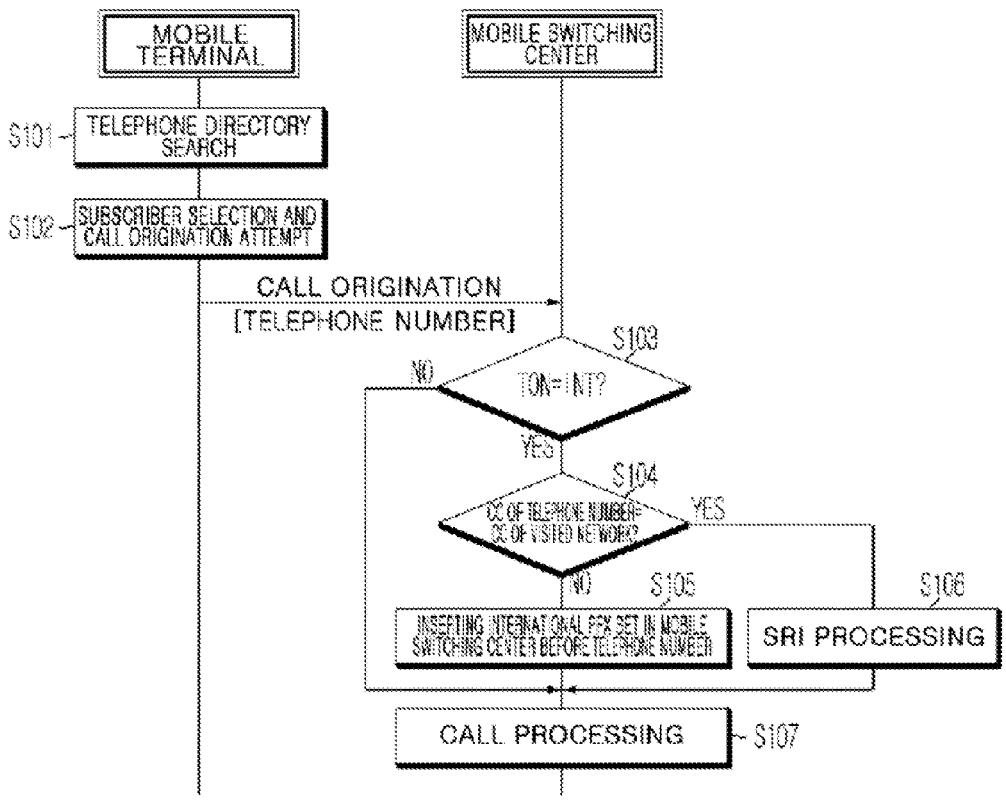
FIG. 1 is a flow chart of a conventional call connecting method performed on a receiving number stored in a telephone directory of a mobile terminal.
Figure 2:
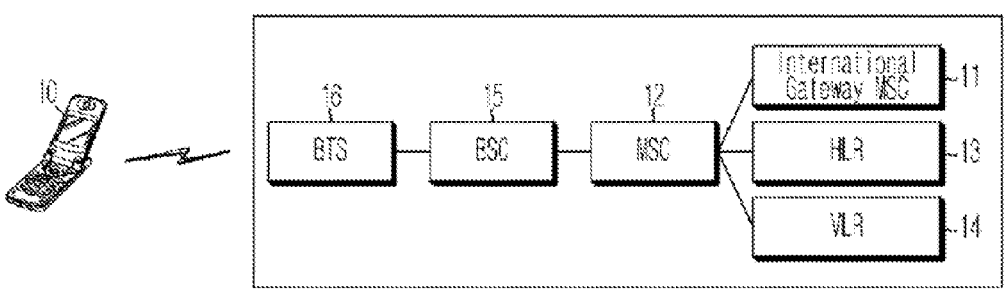
FIG. 2 is a block diagram illustrating a configuration of a mobile communication system, to which the present invention is applied.

FIG. 2 is a schematic block diagram illustrating a configuration of a mobile communication system, to which the present invention is applied.

Referring to FIG. 2, the mobile communication system, to which the present invention is applied, comprises an international gateway MSC 11, a mobile switching center (MSC) 12, a home location register (HLR) 13, a visitor location register (VLR) 14, a base station controller (BSC) 15 and a base station transceiver system (BTS) 16. Preferably, the mobile communication system is a WCDMA (Wideband CDMA) network communication system suitable for international roaming, however the present invention is not limited in this regard.

The international gateway MSC 11 performs an effective network interworking function with PSTN (Public Switched Telephone Network), other mobile service provider network or an international call service provider network.

The mobile switching center (MSC) 12 provides an interface function with the base station controller (BSC) 15, and provides an exchange function between mobile subscribers, and an exchange function (interworking function) between a mobile subscriber and a fixed subscriber of PSTN or ISDN (Integrated Services Digital Network). For this purpose, the mobile switching center (MSC) 12 provides a function for exchanging information with the home location register (HLR) 13 and the visitor location register (VLR) 14 that store a subscriber information.

And, the mobile switching center (MSC) 12 includes an international roaming service providing system (refer to 400 of FIG. 8) for international roaming of a mobile terminal (for example, a WCDMA terminal). The international roaming service providing system 400 transmits a provider information to the mobile terminal 10, so that the mobile terminal 10 operates in an international roaming mode, and when the international roaming service providing system 400 receives a call origination request from the mobile terminal 10 operating in an international roaming mode, the international roaming service providing system 400 performs call processing by analyzing an incoming number and requesting call origination to the corresponding home location register (HLR) 13 or international gateway MSC 11.

In the case that a country code (CC) included in the incoming number requested for call origination is not a home country code, the mobile switching center (hereinafter referred to as a 'foreign mobile switching center') (MSC) 12 that belongs to a visited network when roaming, transmits the call to the international gateway MSC 11 and performs international call processing, in the case that the country code (CC) of the incoming number is a home country code, transmits an SRI (Sending Routing Information) message to the home location register (HLR) 13 and performs local call processing, and in the case that the incoming number is a number of other mobile service provider of home country, transmits IAM (Initial Address Message) to a mobile switching center of the corresponding mobile service provider. For example, in the case that a Chinese business man A has a telephone number of 010-1234 (a country code of China is '86'), the foreign mobile switching center (MSC) 12, where the Chinese business man A belongs, is registered so that '+86101234' and '0101234' are routed to the same home location register (HLR) 13.

At this time, an incoming number of a home network requested for call origination from the mobile terminal 10 corresponds to a number changed by the mobile terminal 10. That is, according to a user's selection in a telephone directory or a user's input of a telephone number using a keypad, the incoming number of the home network requested for call origination from the mobile terminal 10 corresponds to a number that a home country code set in the mobile terminal 10 is inserted before the telephone number, a first "0" of the telephone number is deleted and TON of the incoming number is changed into an international call.

The configurations of the international roaming service providing system 400 and the mobile terminal 10 are described in detail later with reference to FIGS. 8 to 10.

The home location register (HLR) 13, as a database for managing a subscriber information, is configured to implement real-time DB management, and performs a routing function of a called party subscriber.

The base station controller (BSC) 15 performs functions for matching with the base station transceiver system (BTS) 16, handover processing between cells or call control, and a single base station controller (BSC) 15 controls a plurality of base station transceiver systems (BTSs) 16.

The base station transceiver system (BTS) 16 performs functions for radio signal sending and receiving, system synchronization (GPS), radio channel encoding and decoding, measurement of signal intensity and quality (up-link), baseband signal processing, diversity, radio resource management, or self-maintenance and self-repair.

A method for providing a roaming service of an international call that is provided to the mobile terminal 10 roaming in a foreign country, is described with reference to FIGS. 3 to 7.

Figure 3:
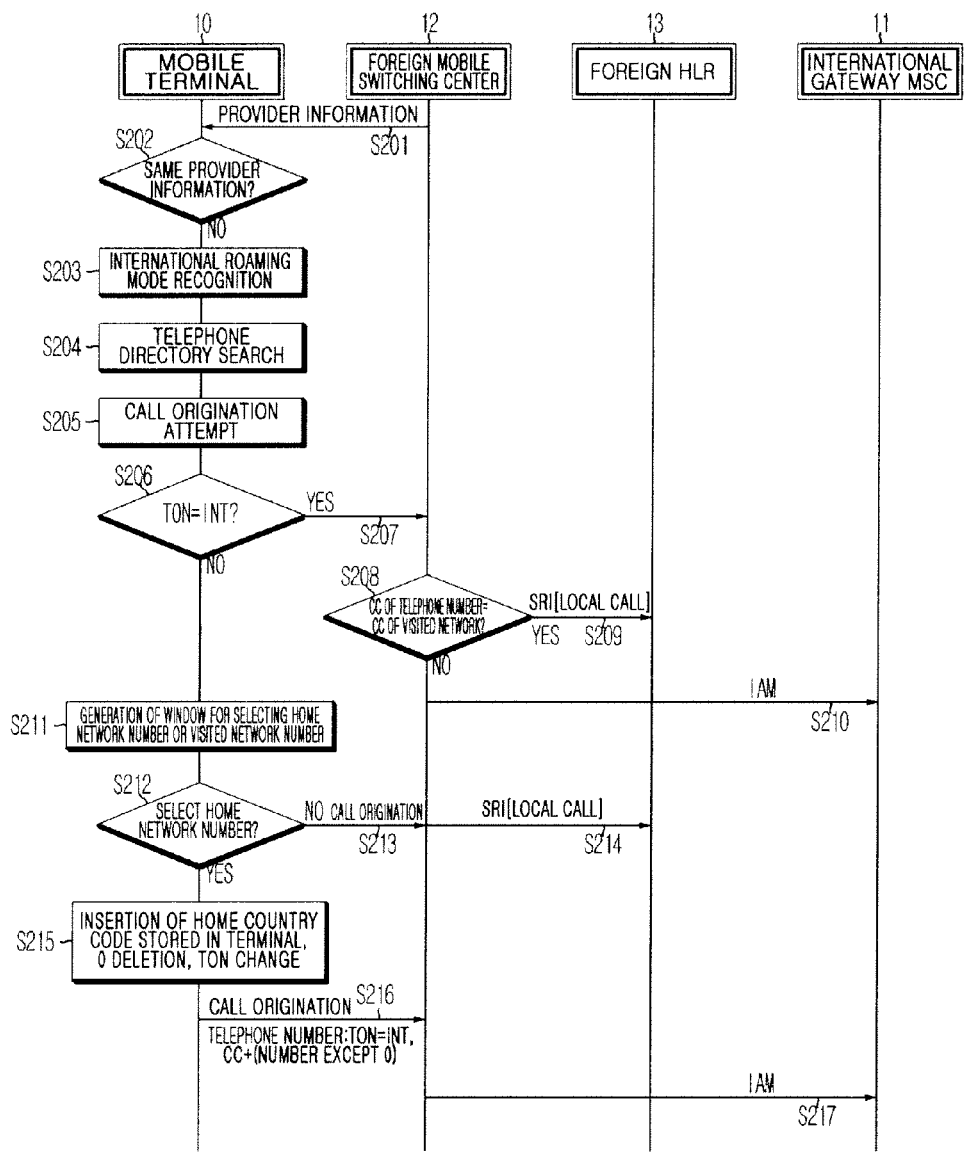
FIGS. 3 and 4 are flow charts illustrating a method for providing a roaming service of an international call according to an embodiment of the present invention.

First, FIG. 3 is a flow chart illustrating a method for providing a roaming service of an international call according to an embodiment of the present invention.

Referring to FIG. 3, the mobile terminal 10 receives a provider information from the foreign mobile switching center (MSC) 12 (S201), and compares the received provider information with a provider information stored in a smart card (USIM) (S202).

In the case that the provider information received from the foreign mobile switching center (MSC) 12 is the same as the provider information stored in the smart card (USIM), the mobile terminal 10 performs general call processing (not shown), and in the case that the received provider information is not the same as the provider information stored in the smart card (USIM), recognizes as an international roaming mode (S203).

In an international roaming mode, the mobile terminal 10 checks TON of an incoming number that a user attempted call origination according to a user's search of a telephone directory and selection of a telephone number (S204 to S206).

In the case that the TON of the incoming number is judged as an international call (TON=INT), the mobile terminal 10 requests call origination of the selected incoming number to the foreign mobile switching center (MSC) 12 (S207).

The foreign mobile switching center (MSC) 12 compares a country code (CC) of the incoming number with a country code (CC) of a visited network where the foreign mobile switching center (MSC) 12 belongs, and checks whether the country code (CC) of the incoming number is the same as a country code (CC) of a visited network (S208).

In the case that the country code (CC) of the incoming number is the same as a country code (CC) of a visited network, the foreign mobile switching center (MSC) 12 transmits an SRI message to the home location register (hereinafter referred to as a 'foreign home location register') (HLR) 13 belonging to the visited network, and performs local call processing (S209), and in the case that the country code (CC) of the incoming number is not the same as a country code (CC) of a visited network, the foreign mobile switching center (MSC) 12 transmits IAM to the international gateway MSC 11 and performs international call processing (S210).

In the case that the TON of the incoming call is not judged as an international call in the step S206, the mobile terminal 10 generates a window for selecting whether the inputted incoming number is a number of a home network (a local number) or a number of a visited network, and provides the window through a user interface (UI) (S211).

When the mobile terminal 10 receives selection of the user and judges whether the incoming number is a local number (S212), in the case that the incoming call is not a local number, the incoming call is a number of a home network, and thus the mobile terminal 10 requests call origination to the foreign mobile switching center (MSC) 12 (S213), and the foreign mobile switching center (MSC) 12 transmits an SRI message to the foreign home location register (HLR) 13 and performs local call processing (S214). Alternatively, the foreign mobile switching center (MSC) 12 may transmit an SRI message to a gateway MSC of other mobile service provider of a visited network, and performs local call processing.

Meanwhile, in the case that the incoming number is judged as a local number in the step S212, the mobile terminal 10 inserts a set home country code before the telephone number, deletes a first "0" of the telephone number, and changes the TON of the incoming number into an international call (TON=INT) (S215).

Subsequently, the mobile terminal 10 requests call origination to the changed incoming number to the foreign mobile switching center (MSC) 12 (S216), and the foreign mobile switching center (MSC) 12 transmits IAM to the international gateway MSC 11 (S217).

Figure 4:
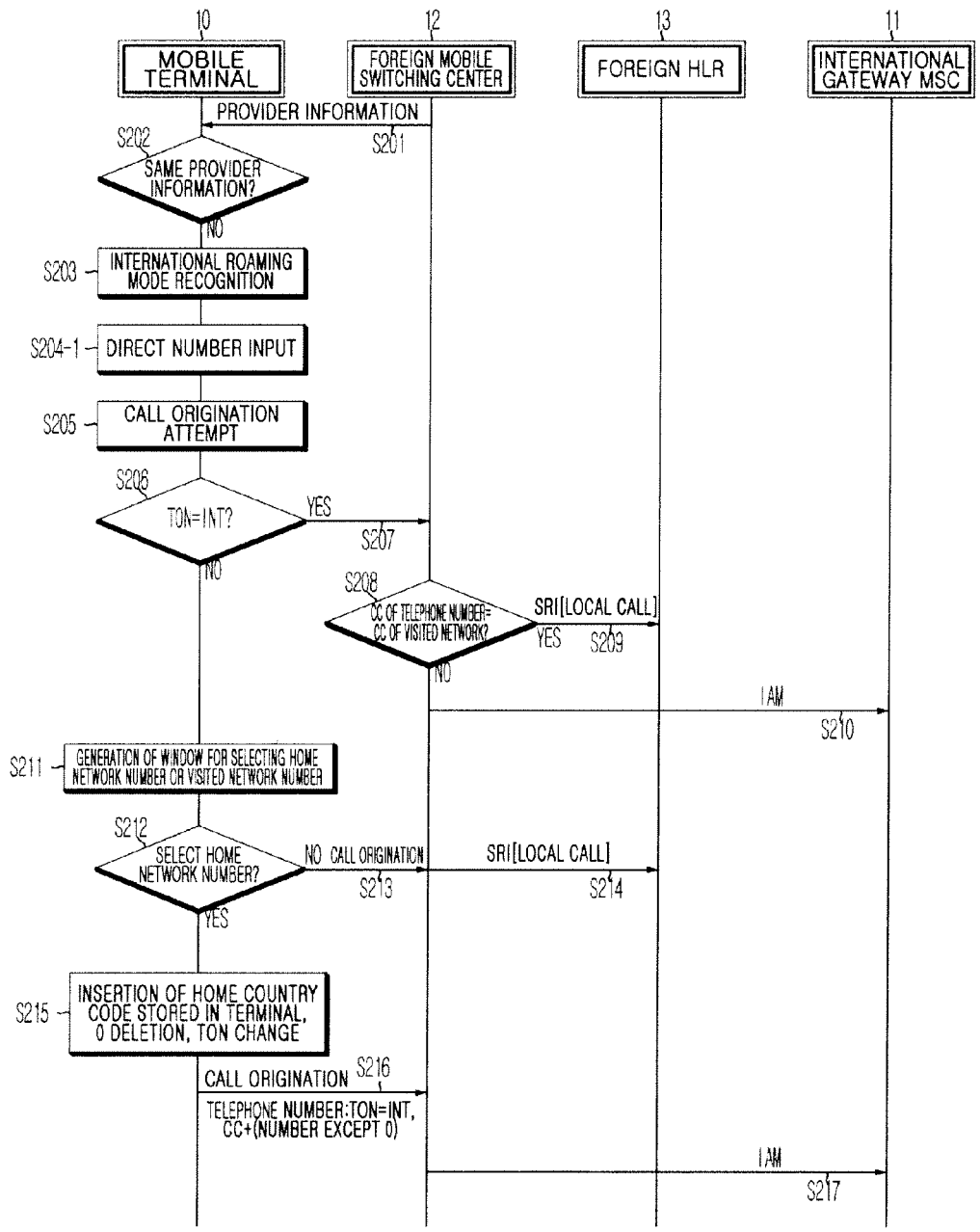

FIG. 4 is a flow chart illustrating a method for providing a roaming service of an international call according to another embodiment of the present invention. This embodiment is different from the above-mentioned embodiment in that call origination attempt of the mobile terminal 10 is made by a direct number input of a user.

That is, in the step S204-1, a user does not use a telephone directory of the mobile terminal 10, but instead directly inputs an incoming number using a keypad of the mobile terminal 10 and attempts call origination.

In call origination attempt, the mobile terminal 10 generates a window for selecting whether the inputted incoming number is a number of a home network (a local number) or a number of a visited network, and provides the window through a user interface (UI) in the same way as the above-mentioned embodiment (S211). The subsequent process is the same as that of the above-mentioned embodiment, and its detailed description is omitted.

Figure 5:
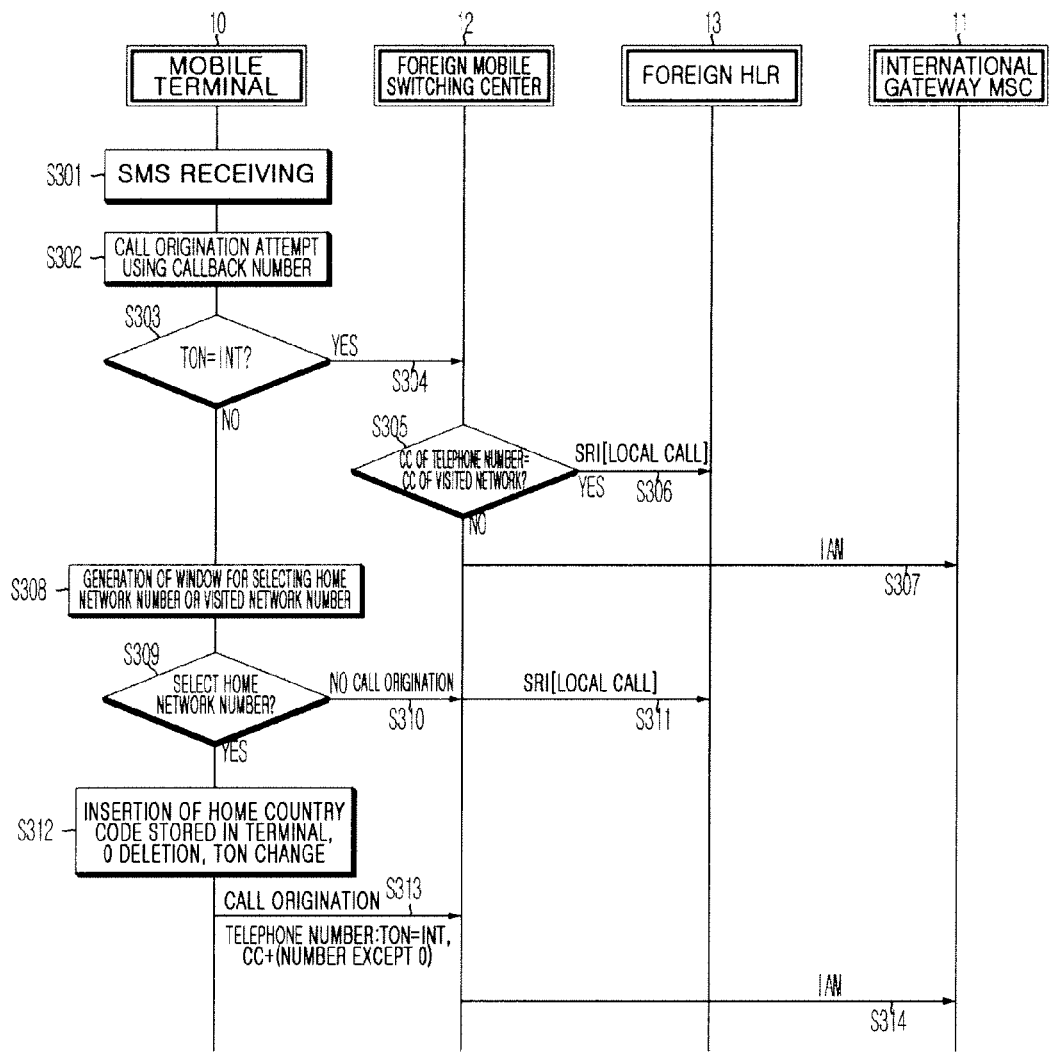
FIG. 5 is a flow chart illustrating a step for originating an international call using SMS callback according to the present invention.

FIG. 5 is a flow chart illustrating a method for providing a roaming service of an international call using SMS callback.

Referring to FIG. 5, the mobile terminal 10 receives an SMS message, and when a user attempts call origination, checks TON of an incoming number using a callback number (S301 to S303).

In the case that the TON of the incoming number is judged as an international call (TON=INT), the mobile terminal 10 requests call origination of the selected incoming number to the foreign mobile switching center (MSC) 12 (S304).

The foreign mobile switching center (MSC) 12 compares a country code (CC) of the incoming number with a country code (CC) of a visited network where the foreign mobile switching center (MSC) 12 belongs, and checks whether the country code (CC) of the incoming number is the same as a country code (CC) of a visited network (S305).

In the case that the country code (CC) of the incoming number is the same as a country code (CC) of a visited network, the foreign mobile switching center (MSC) 12 transmits an SRI message to the foreign home location register (HLR) 13 and performs local call processing (S306), and in the case that the country code (CC) of the incoming number is not the same as a country code (CC) of a visited network, the foreign mobile switching center (MSC) 12 transmits IAM to the international gateway MSC 11 and performs international call processing (S307).

In the case that the TON of the incoming call is not judged as an international call in the step S303, the mobile terminal 10 generates a window for selecting whether the inputted incoming number is a number of a home network (a local number) or a number of a visited network, and provides the window through a user interface (UI) (S308).

When the mobile terminal 10 receives selection of the user and judges whether the incoming number is a local number or not (S309), in the case that the incoming call is not a local number, the incoming call is a number of a home network, and thus the mobile terminal 10 requests call origination to the foreign mobile switching center (MSC) 12 (S310), and the foreign mobile switching center (MSC) 12 transmits an SRI message to the foreign home location register (HLR) 13 and performs local call processing (S311). Alternatively, the foreign mobile switching center (MSC) 12 may transmit an SRI message to a gateway MSC of other mobile service provider of a visited network, and performs local call processing.

Meanwhile, in the case that the incoming number is judged as a local number in the step S309, the mobile terminal 10 inserts a set home country code before the incoming number, deletes a first "0" of the incoming number, and changes the TON of the incoming number into an international call (TON=INT) (S312).

Subsequently, the mobile terminal 10 requests call origination to the changed incoming number to the foreign mobile switching center (MSC) 12 (S313), and the foreign mobile switching center (MSC) 12 transmits IAM to the international gateway MSC 11 (S314).

Figure 6:
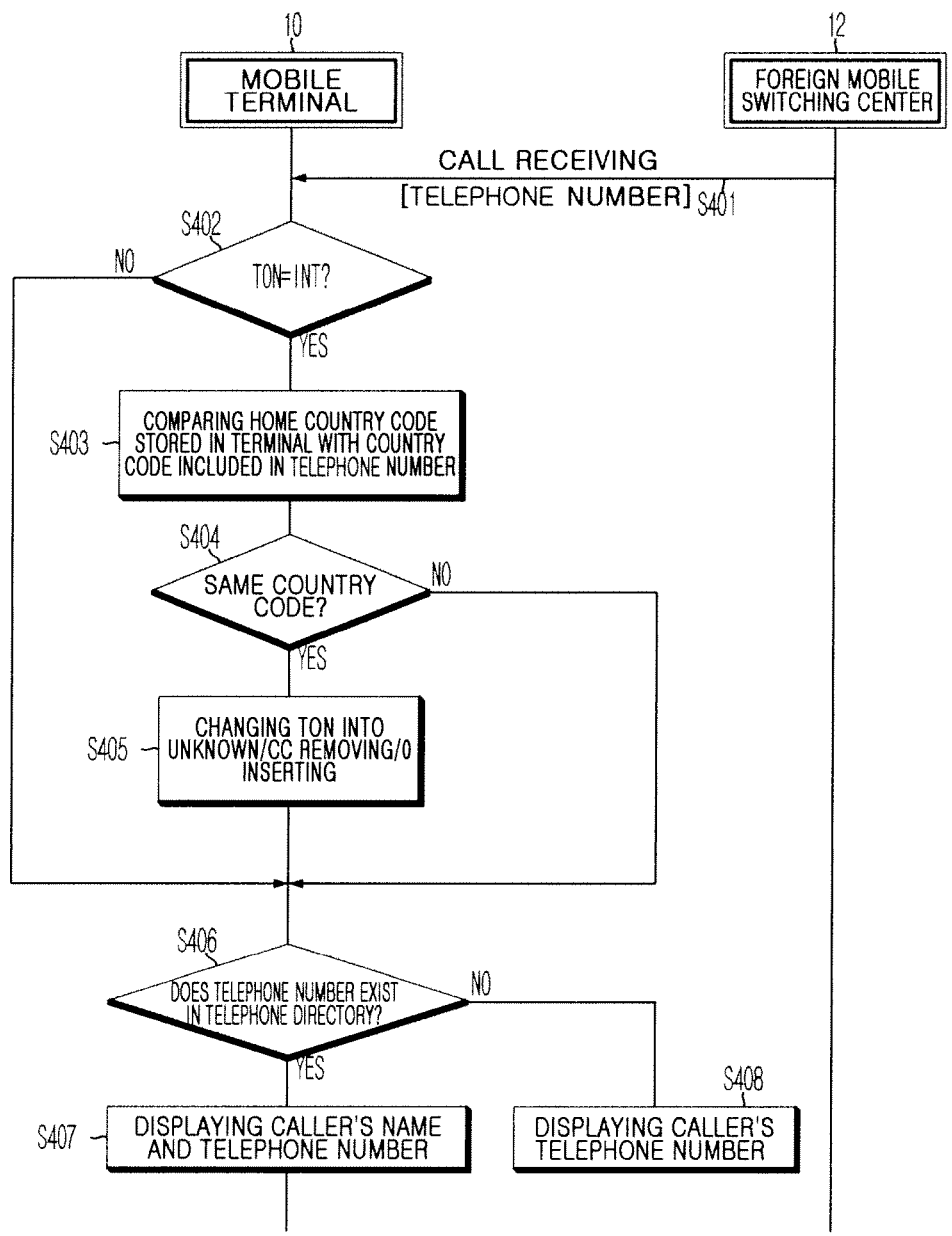
FIGS. 6 and 7 are flow charts illustrating a step for receiving an international call capable of caller identification presentation according to the present invention.
Figure 7:
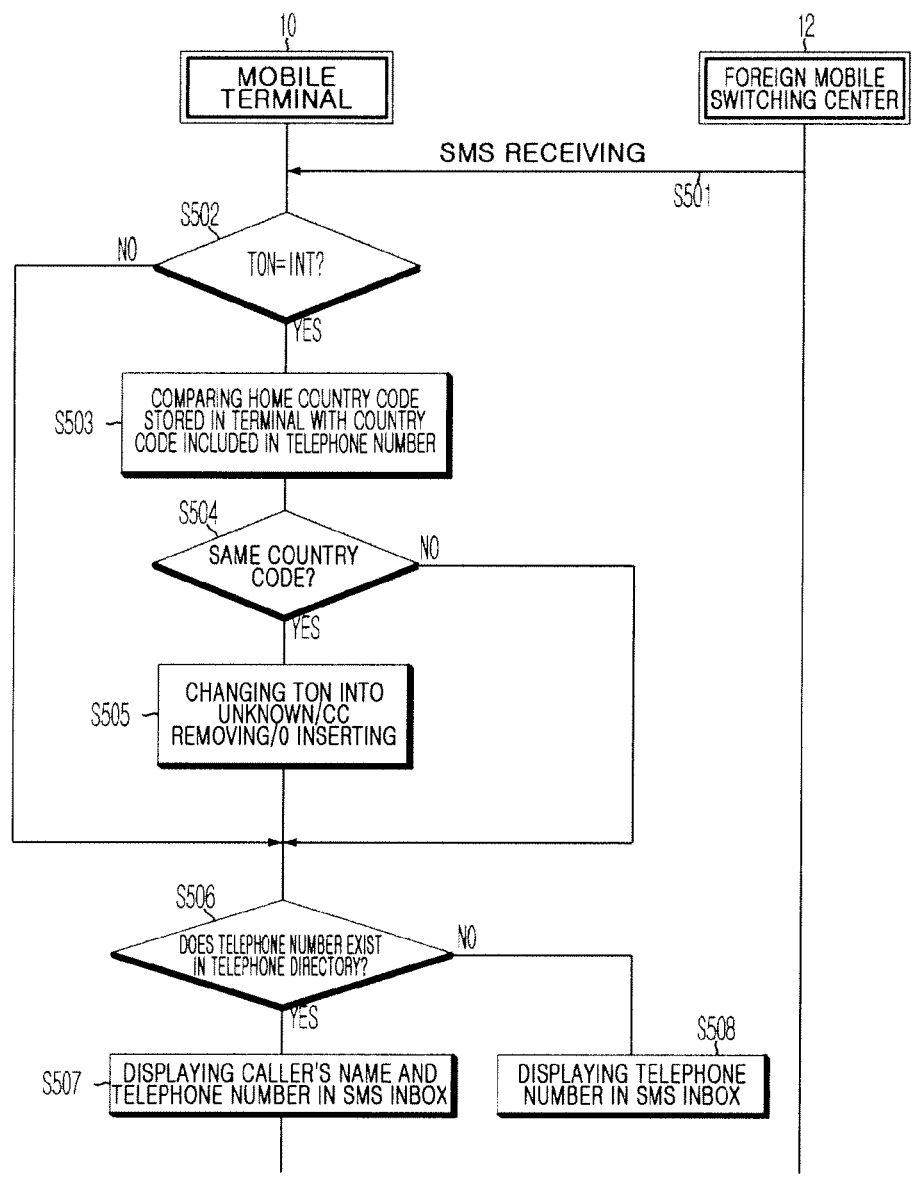

FIGS. 6 and 7 show a method for providing a roaming service of an international call that is capable of caller identification presentation.

First, referring to FIG. 6, the mobile terminal 10 receives a call from the foreign mobile switching center (MSC) 12 and checks TON of the outgoing number (S401 and S402).

In the case that the TON of the outgoing number is not an international call, the mobile terminal 10 does not perform a special number change, but searches a telephone directory and checks whether the corresponding outgoing number exists in the telephone directory (S406).

In the case that the outgoing number exists in the telephone directory, the mobile terminal 10 displays a corresponding telephone number and a caller name corresponding to the telephone number through a user interface (UI) (S407), and in the case that the outgoing number does not exist in the telephone directory, the mobile terminal 10 displays only a telephone number of a caller (S408).

In the case that the TON of the outgoing number is an international call (TON=INT), the mobile terminal 10 compares a set country code of a home network with a country code transmitted from the foreign mobile switching center (MSC) 12 together with the outgoing number, and checks whether the set country code of a home network is the same as the country code of the outgoing number (S403 and S404).

In the case that the set country code of a home network is not the same as the country code of the outgoing number, the mobile terminal 10 performs the steps S406 to S408 without a special number change.

In case it is judged that the set country code of a home network is the same as the country code of the outgoing number (in the case that the outgoing number is a number of a home network) in the step S404, the mobile terminal 10 changes the TON of the outgoing number into "Unknown" and the outgoing number into a type of local call number (S405) and performs the steps S406 to S408. Preferably, the changing into local call number is made by deleting the home country code of the outgoing number and adding "0" before the outgoing number.

The method for providing a roaming service of an international call of FIG. 7 is different from the above-mentioned embodiment in that when receiving SMS, the mobile terminal 10 displays a caller's identification.

Referring to FIG. 7, the mobile terminal 10 receives an SMS message from the foreign mobile switching center (MSC) 12 and checks TON of an outgoing number (S501 and S502).

In the case that the TON of the outgoing number is not an international call, the mobile terminal 10 does not perform a special number change, but instead searches a telephone directory and checks whether the corresponding outgoing number exists in the telephone directory (S506).

In the case that the outgoing number exists in the telephone directory, the mobile terminal 10 displays a corresponding telephone number and a caller name corresponding to the telephone number through a user interface (UI) (S407), and in the case that the outgoing number does not exist in the telephone directory, the mobile terminal 10 displays only a telephone number of a caller (S508).

Meanwhile, in the case that the TON of the outgoing number is an international call (TON=INT), the mobile terminal 10 compares a set country code of a home network with a country code transmitted from the foreign mobile switching center (MSC) 12 together with the outgoing number, and checks whether the set country code of a home network is the same as the country code of the outgoing number (S503 and S504).

In the case that the set country code of a home network is not the same as the country code of the outgoing number, the mobile terminal 10 performs the steps S506 to S508 without special number change.

In case it is judged that the set country code of home network is the same as the country code of the outgoing number (in the case that the outgoing number is a number of a home network) in the step S504, the mobile terminal 10 changes the TON of the outgoing number into "Unknown" and the outgoing number into a type of local call number (S505) and performs the steps S506 to S508. Preferably, the changing into local call number is made by deleting the home country code of the outgoing number and adding "0" before the outgoing number.

Figure 8:
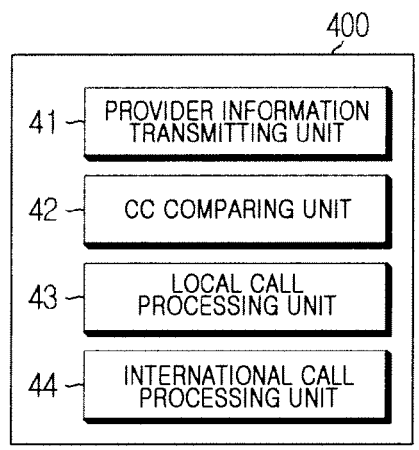
FIG. 8 is a block diagram illustrating a system for providing a roaming service of an international call according to the present invention.

FIG. 8 is a block diagram illustrating a system for providing a roaming service of an international call according to the present invention.

Referring to FIG. 8, the international roaming service providing system 400 comprises a provider information transmitting unit 41, a CC comparing unit 42, a local call processing unit 43 and an international call processing unit 44. Preferably, the international roaming service providing system 400 is built in the mobile switching center (MSC) 12 of the mobile communication network, however the present invention is not limited in this regard, and the international roaming service providing system 400 may be configured in the form of a separate external server.

The provider information transmitting unit 41 transmits a network service provider information to the mobile terminal 10 to allow the mobile terminal 10 to recognize an international roaming mode.

When the mobile terminal 10 requests call origination, the CC comparing unit 42 compares a country code (CC) of an incoming number with a country code (CC) of a visited network and checks whether the incoming number is an international call or a local call.

In the case that the incoming number is checked as a number of a visited network by the CC comparing unit 42, the local call processing unit 43 transmits an SRI message to the home location register 13 and performs local call processing.

In the case that TON of the incoming number checked by the CC comparing unit 42 is an international call (TON=INT) and the country code (CC) of the incoming number is not a home country code, the international call processing unit 44 transmits IAM to the international gateway MSC 11 and performs international call processing.

Here, in the case that the incoming number requested for call origination from the mobile terminal 10 is a number of a home network, the incoming number corresponds to a number changed into an international call by the mobile terminal 10. That is, the mobile terminal 10 operating in an international roaming mode is requested for call origination to a number of a home network by telephone directory search of a user, direct number input of a user or SMS callback, and the mobile terminal 10 inserts a set home country code before the incoming number, deletes a first "0" of the incoming number and changes the TON of the incoming number into an international call.

Figure 9:
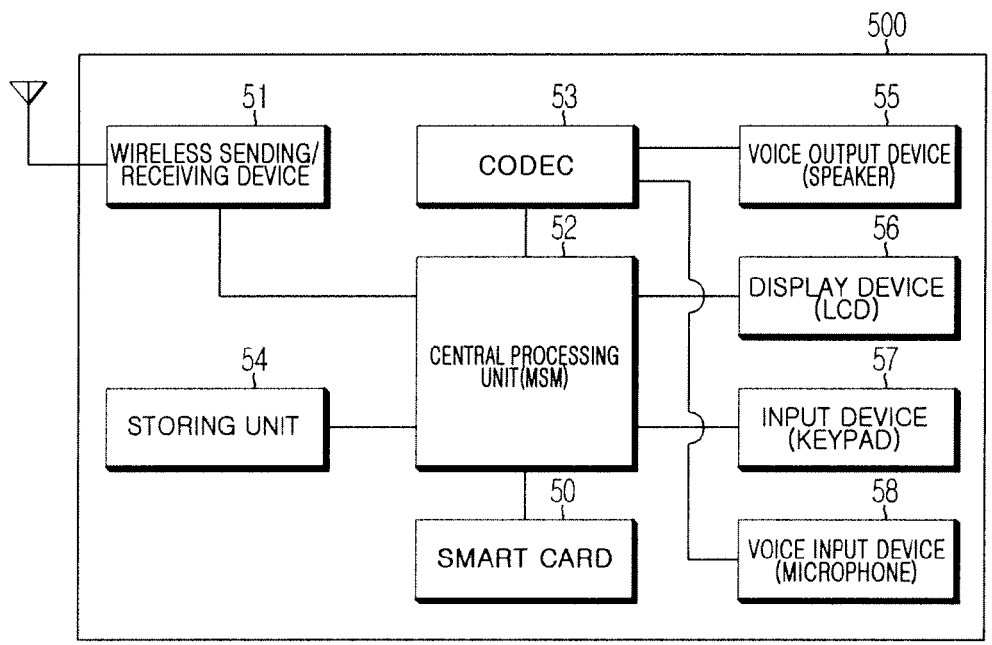
FIG. 9 is a block diagram illustrating a configuration of a mobile terminal used in the international roaming service method according to the present invention.

FIG. 9 is a block diagram illustrating a configuration of a mobile terminal used in the international roaming service method according to the present invention.

Referring to FIG. 9, the mobile terminal 10 according to a preferred embodiment of the present invention comprises a wireless sending/receiving device 51, a central processing unit (MSM) 52, a codec 53, a storing unit 54, a voice output device (speaker) 55, a display device (LCD) 56, an input device (keypad) 57, a voice input device (microphone) 58 and a smart card 50.

The wireless sending/receiving device 51 sends/receives wirelessly a signal with a base station transceiver system through an antenna, so that the signal transmitted through the wireless sending/receiving device 51 is transmitted to a wired or wireless terminal of the opponent party through the base station transceiver system and a mobile communication network.

The smart card 50 stores MCC (Mobile Country Code) and MNC (Mobile Network Code) information for certifying a mobile communication network. The smart card 50 may include SIM, UIM or USIM.

The codec 53 processes a signal received from the wireless sending/receiving device 51 by control of the central processing unit (MSM) 52 and outputs the signal to the voice output device (speaker) 55, and the codec 53 processes a voice signal received from the voice input device (microphone) 58 and transmits the voice signal to the central processing unit (MSM) 52, so that the voice signal is transmitted through the wireless sending/receiving device 51.

The voice output device (speaker) 55 outputs voice received from the codec 53, and receives voice from the voice input device (microphone) 58 and transmits the voice to the codec 53.

The input device (keypad) 57 receives a menu selection signal or a telephone number of a called party through a button.

The display device (LCD) 56 outputs a display by control of the central processing unit (MSM) 52.

The storing unit 54 stores a mobile file system (image, character or icon), an address book, a short text message, photo, an audio file or a moving image file. And, the storing unit 54 stores a provider information, a home country code or a telephone directory, for which the mobile terminal subscribed.

The central processing unit (MSM) 52 operates and controls the mobile terminal 10, and includes an international roaming apparatus 600 that recognizes an international roaming mode according to a provider information received from a mobile communication network, and in the case that TON of an incoming number requested for call origination by telephone directory search or direct number input of a user in an international roaming mode is a number of a home network (a local call number), changes the incoming number into an international call number and the TON of the incoming number into an international call and requests call origination to a mobile switching center (MSC) of a mobile communication network.

Figure 10:
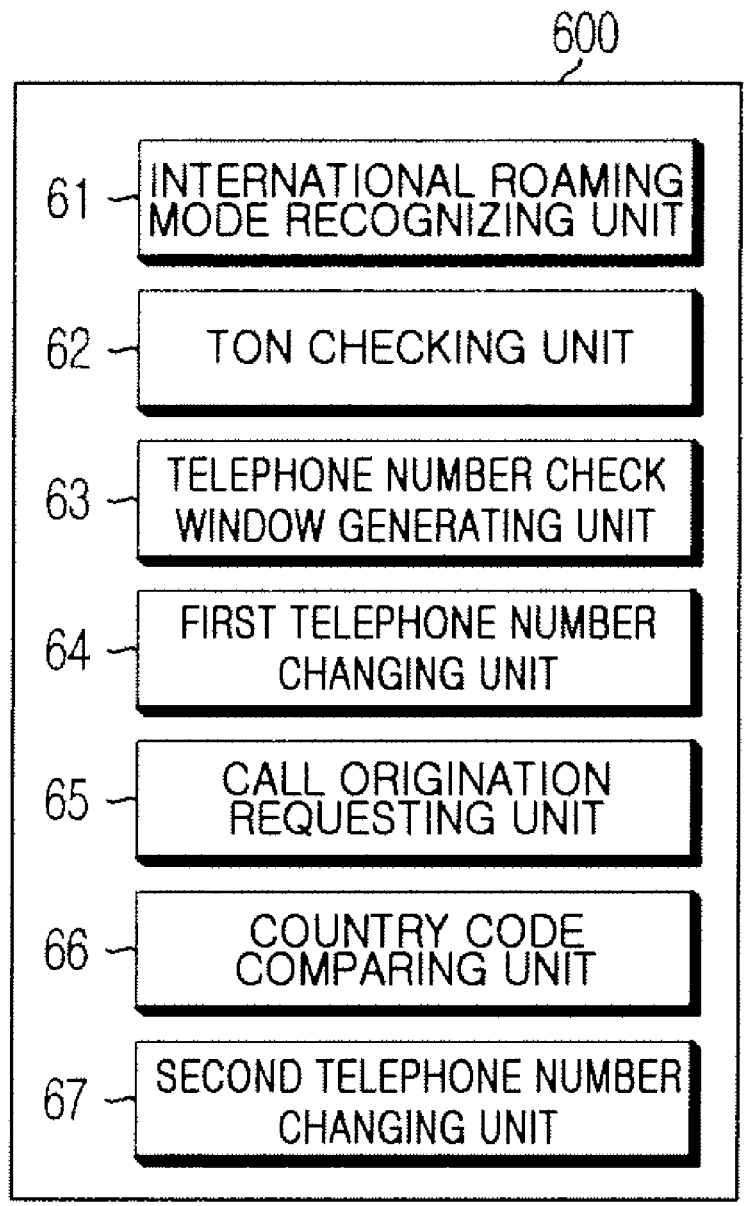
FIG. 10 is a block diagram illustrating an international roaming apparatus provided in the mobile terminal according to a preferred embodiment of the present invention.

The international roaming apparatus 600 shown in FIG. 10 comprises an international roaming mode recognizing unit 61, a TON checking unit 62, an incoming number check window generating unit 63, an incoming number changing unit 64 and a call origination requesting unit 65. And, in the case that the mobile terminal 10 provides a caller identification presentation function, the international roaming apparatus 600 further comprises a country code comparing unit 66 and an outgoing number changing unit 67.

The international roaming mode recognizing unit 61 compares a provider information received from the foreign switching center (MSC) 12 of a mobile communication network with a provider information stored in the smart card 50, and recognizes an international roaming mode. Preferably, the international roaming mode recognizing unit 61 compares MCC and MNC information stored in the smart card 50 with MCC and MNC information transmitted from the mobile communication network, and detects an international roaming mode.

The TON checking unit 62 receives a call origination request according to telephone directory search of a user, direct number input of a user or SMS callback, and judges whether TON of the incoming number is an international call or a local call.

The incoming number check window generating unit 63 generates a message window for checking whether the incoming number that a user attempted call origination is a number of a home network or a number of a visited network.

The message window generated by the incoming number check window generating unit 63 is displayed through a user interface (UI) of the mobile terminal 10.

In the case that when originating a call, the incoming number is checked as a number of a home network, the incoming number changing unit 64 changes the incoming number into an international call number using a home country code stored in the mobile terminal, and changes the TON of the incoming umber into an international call. Preferably, the incoming number changing unit 64 changes the incoming number into an international call number by inserting a home country code stored in the mobile terminal before the incoming number and deleting a first "0" of the incoming number, and changing the TON of the incoming number into an international call.

In the case that the incoming number is a number of a home network, the call origination requesting unit 65 requests call origination to the incoming number changed by the incoming number changing unit 64 to the foreign switching center (MSC) 12, and in the case that the incoming number is a number of a visited network, the call origination requesting unit 65 requests local call origination.

In the case that the TON of the outgoing number received from the foreign switching center (MSC) 12 is an international call, the country code comparing unit 66 compares a home country code stored in the mobile terminal with a country code of the outgoing number and checks whether the outgoing number is a number of a home network.

In the case that the country code comparing unit 66 checks the country code of the outgoing number as a country code of a home network, the outgoing number changing unit 67 changes the outgoing number into a local call number and the TON of the outgoing number into "Unknown". That is, the outgoing number changing unit 67 changes the outgoing number into a local call number by deleting the home country code of the outgoing number and adding "0" before the outgoing number.

A caller number display unit (not shown) included in the user interface (UI) of the mobile terminal 10 searches a telephone directory of the mobile terminal 10 and outputs the name of a calling party subscriber corresponding to the outgoing number changed by the outgoing number changing unit 67 to a display of the mobile terminal 10.

According to the present invention, a recording medium (RAM or ROM) that stores a program for performing the above-mentioned process may be mounted in the mobile terminal 10 and the international roaming service providing system 400.

As such, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

According to the present invention, with international roaming of a mobile terminal, when a user selects a telephone number of a home network stored in a telephone directory of the mobile terminal and originates a call, the call is processed as an international call by the mobile terminal and a mobile communication network, and thus the user can conveniently use the telephone directory of the mobile terminal used in the home country when roaming in a foreign country.

And, a mobile terminal is capable of classifying a call into a telephone number of a home network and a telephone number of a visited network and processing the call according to classification, and thus, when storing telephone numbers into a telephone number of the mobile terminal, the present invention eliminates the need for inserting a country code into every telephone number, thereby providing a user with convenience.

Further, in the case that an incoming number of a call or SMS is a number of a home network, the present invention is capable of checking the incoming number in a telephone directory and displaying a caller's identification corresponding to the incoming number.

The invention claimed is:

1. A method for providing a roaming service of an international call, as a roaming method of a mobile terminal, the method comprising:
   (a) in an international roaming mode, checking TON (Type Of Number) of an incoming number attempted to originate a call;
   (b) in the case that the TON of the incoming number is not an international call, checking whether the incoming number is a telephone number of a home network or a telephone number of a visited network; and
   (c) in the case that the incoming number is checked as a telephone number of a home network, changing the incoming number into an international call number using a home country code (CC) stored in a storing unit, changing the TON of the incoming number into an international call, and requesting call origination to the incoming number, and in the case that the incoming number is checked as a telephone number of a visited network, requesting local call origination without number change.

2. The method for providing a roaming service of an international call according to claim 1,
   wherein the call origination attempt in the step (a) is made by telephone directory search and selection of a user, direct input of a user or SMS (Short Message Service) callback.

3. The method for providing a roaming service of an international call according to claim 1 or 2,
   wherein the step (b) further includes:
   generating a message window for checking whether the incoming number is a telephone number of a home network or a telephone number of a visited network, and displaying the message window through a user interface.

4. The method for providing a roaming service of an international call according to claim 1,
   wherein the changing into an international call number is made by inserting the home country code (CC) before the incoming number and deleting a first "0" included in the incoming number.

5. A method for providing a roaming service of an international call, as a roaming method of a mobile terminal, the method comprising:
   in an international roaming mode, checking TON (Type of Number) of an outgoing number when receiving a call or SMS;
   in the case that the TON of the outgoing number is an international call, comparing a country code of the outgoing number with a home country code stored in a storing unit;
   in the case that the country code of the outgoing number is the same as the home country code stored in the storing unit, changing the outgoing number into a local call number and changing the TON of the outgoing number into a type that is not recognized as an international call; and
   searching a telephone directory stored in the storing unit and outputting a number of a calling party subscriber corresponding to the outgoing number on a display.

6. The method for providing a roaming service of an international call according to claim 5,
   wherein the changing into a local call number is made by deleting a home country code of the outgoing number and adding "0" before the outgoing number.

7. The method for providing a roaming service of an international call according to claim 1 or 5,
   wherein the international roaming mode is provided by a WCDMA (Wideband CDMA) network.

8. A mobile terminal for providing a roaming service of an international call, the mobile terminal comprising:
   a storing unit for storing a country code and a telephone number of a home network, for which the mobile terminal subscribed;
   an international roaming mode recognizing unit for comparing a provider information received from a mobile communication network with a set provider information and judging whether it is an international roaming mode;
   a TON (Type of Number) checking unit for, in an international roaming mode, checking TON of an incoming number requested for call origination;
   an incoming number changing unit for, in the case that the TON of the incoming number is not an international call and is a telephone number of a home network, changing the incoming number into an international call number using a home country code stored in the storing unit, and changing the TON of the incoming number into an international call; and
   a call origination requesting unit for, in the case that the incoming number is a telephone number of a home network, requesting international call origination to the incoming number changed by the incoming number changing unit, and in the case that the incoming number is a telephone number of a visited network, requesting local call origination.

9. The mobile terminal for providing a roaming service of an international call according to claim 8,
   wherein the TON checking unit checks TON of an incoming number requested for call origination by telephone directory search and selection of a user, direct input of a user or SMS callback.

10. The mobile terminal for providing a roaming service of an international call according to claim 8, further comprising:
    an incoming number check window generating unit for, in the case that the TON of the incoming number is not an international call, generating a message window for allowing a user to check whether the incoming number is a telephone number of a home network or a telephone number of a visited network.

11. The mobile terminal for providing a roaming service of an international call according to claim 8,
    wherein the incoming number changing unit changes the incoming number into an international call number by inserting a home country code before the incoming number and deleting a first "0" included in the incoming number.

12. A mobile terminal for providing a roaming service of an international call, the mobile terminal comprising:
    a storing unit for storing a country code and a telephone number of a home network, for which the mobile terminal subscribed;

a TON (Type of Number) checking unit for, in an international roaming mode, checking TON of an outgoing number when receiving a call or SMS;

a country code comparing unit for, in the case that the TON of the outgoing number is an international call, comparing a country code of the outgoing number with a home country code stored in the storing unit;

an outgoing number changing unit for, in the case that the country code of the outgoing number is the same as the home country code stored in the storing unit, changing the outgoing number into a local call number and changing the TON of the outgoing number into a type that is not recognized as an international call; and a caller number displaying unit for searching a telephone directory of the mobile terminal and outputting a number of a calling party subscriber corresponding to the outgoing number on a display.

13. The mobile terminal for providing a roaming service of an international call according to claim 12, wherein the outgoing number changing unit changes the outgoing number into a local call number by deleting the home country code of the outgoing number and inserting "0" before the outgoing number.

* * * * *